(12) United States Patent
Yamaguchi et al.

(10) Patent No.: US 12,315,921 B2
(45) Date of Patent: May 27, 2025

(54) NON-AQUEOUS ELECTROLYTE SECONDARY BATTERY AND METHOD FOR MANUFACTURING SAME

(71) Applicant: Prime Planet Energy & Solutions, Inc., Tokyo (JP)

(72) Inventors: Hiroyuki Yamaguchi, Toyota (JP); Masataka Tomita, Okazaki (JP)

(73) Assignee: PRIME PLANET ENERGY & SOLUTIONS, INC., Tokyo (JP)

(\*) Notice: Subject to any disclaimer, the term of this patent is extended or adjusted under 35 U.S.C. 154(b) by 484 days.

(21) Appl. No.: 17/717,137

(22) Filed: Apr. 11, 2022

(65) Prior Publication Data

US 2022/0328819 A1 Oct. 13, 2022

(30) Foreign Application Priority Data

Apr. 13, 2021 (JP) .................. 2021-067927

(51) Int. Cl.
*H01M 4/505* (2010.01)
*H01M 4/02* (2006.01)
(Continued)

(52) U.S. Cl.
CPC ........... *H01M 4/505* (2013.01); *H01M 4/366* (2013.01); *H01M 4/583* (2013.01);
(Continued)

(58) Field of Classification Search
CPC ...... H01M 4/366; H01M 4/505; H01M 4/583; H01M 4/587; H01M 10/0568; H01M 2300/0028; H01M 2004/028
See application file for complete search history.

(56) References Cited

U.S. PATENT DOCUMENTS

2011/0217574 A1 9/2011 Toyama et al.
2014/0349166 A1 11/2014 Chiga et al.
(Continued)

FOREIGN PATENT DOCUMENTS

CN 105322165 A 2/2016
CN 105428638 A 3/2016
(Continued)

*Primary Examiner* — Brittany L Raymond
(74) *Attorney, Agent, or Firm* — HAUPTMAN HAM, LLP

(57) ABSTRACT

Provided is a non-aqueous electrolyte secondary battery using a spinel-type manganese-containing composite oxide, in which the capacity deterioration in repeated charging and discharging at a high temperature is suppressed. A non-aqueous electrolyte secondary battery disclosed herein includes a positive electrode, a negative electrode, and a non-aqueous electrolytic solution. The positive electrode includes a positive electrode active material layer containing a positive electrode active material. The positive electrode active material includes a lithium composite oxide having a spinel-type crystal structure and including Mn. The positive electrode active material layer includes 0.05% by mass or more and 1.0% by mass or less of orthophosphoric acid with respect to the positive electrode active material. The negative electrode includes a negative electrode active material layer containing a negative electrode active material. The negative electrode active material is graphite. The non-aqueous electrolytic solution includes a fluorine-containing lithium salt.

3 Claims, 3 Drawing Sheets

(51) Int. Cl.
*H01M 4/36* (2006.01)
*H01M 4/583* (2010.01)
*H01M 10/0525* (2010.01)
*H01M 10/0568* (2010.01)
*H01M 10/0569* (2010.01)

(52) U.S. Cl.
CPC ... *H01M 10/0525* (2013.01); *H01M 10/0568* (2013.01); *H01M 10/0569* (2013.01); *H01M 2004/027* (2013.01); *H01M 2004/028* (2013.01); *H01M 2300/0028* (2013.01)

(56) References Cited

U.S. PATENT DOCUMENTS

| | | |
|---|---|---|
| 2015/0311563 A1 | 10/2015 | Abe et al. |
| 2016/0036046 A1 | 2/2016 | Takebayashi |
| 2016/0079596 A1* | 3/2016 | Takebayashi ..... H01M 10/4235 429/231.95 |
| 2016/0111713 A1 | 4/2016 | Yamazaki et al. |
| 2017/0018818 A1 | 1/2017 | Miura et al. |
| 2019/0273256 A1 | 9/2019 | Yokoyama |

FOREIGN PATENT DOCUMENTS

| | | |
|---|---|---|
| CN | 105529435 A | 4/2016 |
| JP | 2011-187193 A | 9/2011 |
| JP | 2013152825 A | 8/2013 |
| JP | 2014-22294 A | 2/2014 |
| JP | 2015-198006 A | 11/2015 |
| JP | 2015-210893 A | 11/2015 |
| JP | 2016-62644 A | 4/2016 |
| JP | 2016-81738 A | 5/2016 |
| JP | 2017-27656 A | 2/2017 |
| JP | 2017-27928 A | 2/2017 |
| JP | 2017-069020 A | 4/2017 |
| JP | 2019-153462 A | 9/2019 |
| WO | 2013/080722 A1 | 6/2013 |

* cited by examiner

NON-AQUEOUS ELECTROLYTE SECONDARY BATTERY AND METHOD FOR MANUFACTURING SAME

BACKGROUND OF THE INVENTION

1. Feld of the Invention

The present disclosure relates to a non-aqueous electrolyte secondary battery. The present disclosure also relates to a method for manufacturing the non-aqueous electrolyte secondary battery. This application claims priority based on Japanese Patent Application No. 2021-067927 filed on Apr. 13, 2021, and the entire contents of the application are incorporated herein by reference.

2. Description of the Related Art

In recent years, non-aqueous electrolyte secondary batteries such as lithium-ion secondary batteries have been suitably used as portable power supplies for personal computers, mobile terminals, and the like and as driving power supplies for vehicles such as battery electric vehicles (BEVs), hybrid electric vehicles (HEVs), and plug-in hybrid electric vehicles (PHEVs).

A technique of forming a film on an electrode in order to suppress the decomposition of a non-aqueous electrolytic solution in a non-aqueous electrolyte secondary battery is known. For example, Japanese Patent Application Publication No. 2013-152825 discloses that in a battery using a titanium-containing lithium transition metal compound having a spinel structure as a negative electrode active material, a phosphorus compound having a P—OH structure is included in a positive electrode or an electrolytic solution so as to form a protective film derived from the phosphorus compound on the positive electrode. Japanese Patent Application Publication No. 2013-152825 describes that the protective film can suppress the decomposition of the electrolytic solution in the vicinity of the positive electrode and thereby suppress the increase in resistance.

SUMMARY OF THE INVENTION

However, as a result of diligent studies by the present inventors, it has been found that the abovementioned related art has a problem that when a lithium composite oxide having a spinel-type crystal structure and including Mn (spinel-type manganese-containing composite oxide) is used as a positive electrode active material of a non-aqueous electrolyte secondary battery, the capacity of the non-aqueous electrolyte secondary battery is significantly deteriorated in repeated charging and discharging at a high temperature.

Accordingly, it is an object of the present disclosure to provide a non-aqueous electrolyte secondary battery using a spinel-type manganese-containing composite oxide, in which capacity deterioration in repeated charging and discharging at a high temperature is suppressed.

The non-aqueous electrolyte secondary battery disclosed herein includes a positive electrode, a negative electrode, and a non-aqueous electrolytic solution. The positive electrode includes a positive electrode active material layer containing a positive electrode active material. The positive electrode active material includes a lithium composite oxide having a spinel-type crystal structure and including Mn. The positive electrode active material layer includes 0.05% by mass or more and 1.0% by mass or less of orthophosphoric acid with respect to the positive electrode active material. The negative electrode includes a negative electrode active material layer containing a negative electrode active material. The negative electrode active material is graphite. The non-aqueous electrolytic solution includes a fluorine-containing lithium salt. By subjecting the non-aqueous electrolyte secondary battery having such a configuration to adequate initial charging treatment, it is possible to provide a non-aqueous electrolyte secondary battery in which capacity deterioration in repeated charging and discharging at a high temperature is suppressed.

In a desired embodiment of the non-aqueous electrolyte secondary battery disclosed herein, the positive electrode active material layer includes 0.1% by mass or more and 0.5% by mass or less of orthophosphoric acid with respect to the positive electrode active material. With such a configuration, it is possible to further suppress capacity deterioration in repeated charging and discharging at a high temperature.

In a desired embodiment of the non-aqueous electrolyte secondary battery disclosed herein, the non-aqueous electrolytic solution further includes an oxalate complex lithium salt. With such a configuration, it is possible to further suppress capacity deterioration in repeated charging and discharging at a high temperature.

In a desired embodiment of the non-aqueous electrolyte secondary battery disclosed herein, the positive electrode active material layer further includes trilithium phosphate. With such a configuration, it is possible to further suppress capacity deterioration in repeated charging and discharging at a high temperature.

Another aspect resides in a method for manufacturing the non-aqueous electrolyte secondary battery having a coating film on the surface of the positive electrode active material disclosed herein, the manufacturing method including: a step of preparing the above-described non-aqueous electrolyte secondary battery, and a step of subjecting the prepared non-aqueous electrolyte secondary battery to initial charging to a voltage of 4.7 V or higher. With such a configuration, it is possible to manufacture a non-aqueous electrolyte secondary battery in which capacity deterioration in repeated charging and discharging at a high temperature is suppressed.

In another aspect, the non-aqueous electrolyte secondary battery disclosed herein includes a positive electrode, a negative electrode, and a non-aqueous electrolytic solution. The positive electrode includes a positive electrode active material layer containing a positive electrode active material. The positive electrode active material includes a lithium composite oxide having a spinel-type crystal structure and including Mn. The negative electrode includes a negative electrode active material layer containing a negative electrode active material. The negative electrode active material is graphite. The non-aqueous electrolytic solution includes a fluorine-containing lithium salt. The positive electrode active material has a coating film on the surface thereof. At least a part of the coating film has a multi-layer structure including a first layer and a second layer located on the first layer. In the first layer, the ratio of the content (atomic %) of P element to the total content (atomic %) of P element and F element determined by scanning transmission electron microscopy/energy dispersive X-ray analysis is 67% or more. In the second layer, the ratio of the content (atomic %) of F element to the total content (atomic %) of P element and F element determined by scanning transmission electron microscopy/energy dispersive X-ray analysis is 38% or more. With such a configuration, it is possible to provide a non-aqueous electrolyte secondary battery in which capacity deterioration in repeated charging and discharging at a high temperature is suppressed.

DESCRIPTION OF THE PREFERRED EMBODIMENTS

Figure 1:
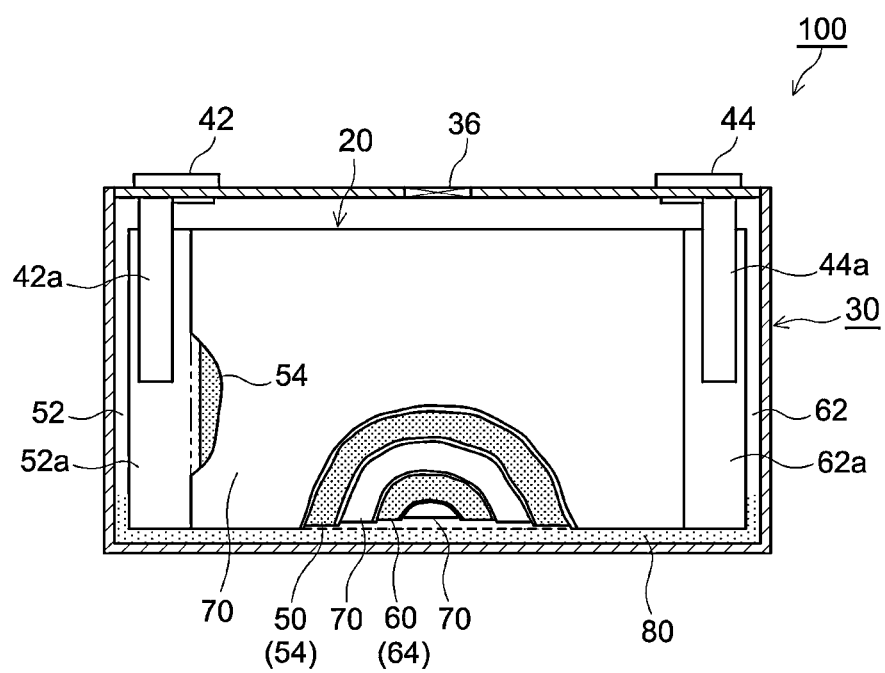
FIG. 1 is a cross-sectional view schematically showing an internal structure of a lithium ion secondary battery according to an embodiment of the present disclosure.

Hereinafter, embodiments according to the present disclosure will be described with reference to the drawings. Matters other than those mentioned in the present specification and required for implementation of the present disclosure can be understood as design matters for those skilled in the art based on the conventional art in the pertinent field. The present disclosure can be implemented based on the content disclosed in the present specification and common technical knowledge in the pertinent field. In addition, in the following drawings, members and portions exhibiting the same action are given of the same reference numerals for description. In addition, dimensional relationships (between a length, a width, a thickness, and the like) in each drawing do not reflect actual dimensional relationships.

In the present description, the "secondary battery" refers to a power storage device that can be repeatedly charged and discharged, and is a term that is inclusive of a so-called storage battery and a power storage element such as an electric double layer capacitor. Further, in the present description, the "lithium ion secondary battery" refers to a secondary battery that uses lithium ions as a charge carrier and realizes charge/discharge by the transfer of charges accompanying the lithium ions between the positive and negative electrodes.

Hereinafter, the first embodiment of the non-aqueous electrolyte secondary battery according to the present disclosure (hereinafter, also referred to as "non-aqueous electrolyte secondary battery (1)") will be described in detail by taking flat angular lithium-ion secondary battery having a flat-shaped wound electrode body and a flat-shaped battery case as an example, but the present disclosure is not intended to be limited to the configuration described in such an embodiment.

A lithium ion secondary battery 100 shown in FIG. 1 is a hermetically sealed battery constructed by accommodating a flat-shaped wound electrode body 20 and a non-aqueous electrolytic solution 80 in a flat angular battery case (that is, an outer container) 30. The battery case 30 is provided with a positive electrode terminal 42 and a negative electrode terminal 44 for external connection, and a thin-walled safety valve 36 set to release an internal pressure of the battery case 30 when the internal pressure rises above a predetermined level. Further, the battery case 30 is provided with an injection port (not shown) for injecting the non-aqueous electrolytic solution 80. The positive electrode terminal 42 is electrically connected to a positive electrode current collector plate 42a. The negative electrode terminal 44 is electrically connected to a negative electrode current collector plate 44a. As the material of the battery case 30, for example, a lightweight metal material having good thermal conductivity such as aluminum is used. FIG. 1 does not accurately represent the amount of the non-aqueous electrolytic solution 80.

Figure 2:
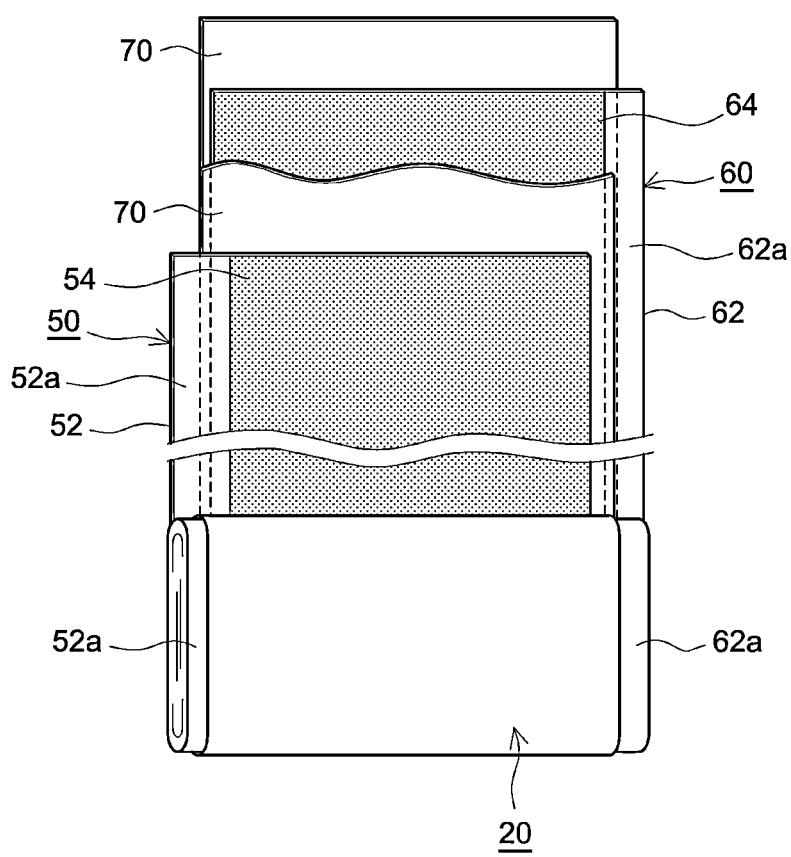
FIG. 2 is a schematic exploded view showing a configuration of a wound electrode body of a lithium ion secondary battery according to an embodiment of the present disclosure.

As shown in FIGS. 1 and 2, the wound electrode body 20 has a form obtained by laminating a positive electrode sheet 50 and a negative electrode sheet 60 with each other with two long separator sheets 70 interposed therebetween and winding the resulting laminate in the longitudinal direction. The positive electrode sheet 50 has a configuration in which a positive electrode active material layer 54 is formed along the longitudinal direction on one side or both sides (here, both sides) of a long positive electrode current collector 52. The negative electrode sheet 60 has a configuration in which a negative electrode active material layer 64 is formed along the longitudinal direction on one side or both sides (here, both sides) of a long negative electrode current collector 62. A positive electrode active material layer non-formation portion 52a (that is, the portion where the positive electrode active material layer 54 is not formed and the positive electrode current collector 52 is exposed) and a negative electrode active material layer non-formation portion 62a (that is, the portion where the negative electrode active material layer 64 is not formed and the negative electrode current collector 62 is exposed) are formed so as to protrude outward from both ends of the wound electrode body 20 in the winding axis direction (that is, the sheet width direction orthogonal to the longitudinal direction). The positive electrode current collector plate 42a and the negative electrode current collector plate 44a are joined to the positive electrode active material layer non-formation portion 52a and the negative electrode active material layer non-formation portion 62a, respectively.

As the positive electrode current collector 52, a known positive electrode current collector used in a lithium ion secondary battery may be used, and examples thereof include sheets or foils of metals having good conductivity (for example, aluminum, nickel, titanium, stainless steel, and the like). Aluminum foil is desirable as the positive electrode current collector 52.

The dimensions of the positive electrode current collector 52 are not particularly limited and may be determined, as appropriate, according to the battery design. When an aluminum foil is used as the positive electrode current collector 52, the thickness thereof is not particularly limited, and is, for example, 5 μm or more and 35 μm or less, and desirably 7 μm or more and 20 μm or less.

In the present embodiment, a lithium composite oxide having a spinel-type crystal structure and including Mn (spinel-type manganese-containing composite oxide) is used as the positive electrode active material. Examples of such a composite oxide include lithium manganate (LiMn$_2$O$_4$) having a spinel-type crystal structure and a composite oxide having a spinel-type crystal structure in which a part of manganese in lithium manganate is replaced with lithium or other element (for example, LiNi$_{0.5}$Mn$_{1.5}$O$_4$ and the like) and the like.

Specifically, as the spinel-type manganese-containing composite oxide, for example, a composite oxide having a composition represented by the following formula (I) can be used.

$$Li_x(M1_yM2_zMn_{2-x-y-z})O_{4-\delta} \tag{I}$$

In the formula (I), M1 is at least one element selected from the group consisting of Ni, Co, and Fe, and is desirably Ni. M2 is at least one element selected from the group consisting of Na, Mg, Al, P, K, Ca, Ba, Sr, Ti, V, Cr, Cu, Ga, Y, Zr, Nb, Mo, In, Ta, W, Re, and Ce, desirably Ti, Al, or Mg.

In the formula (I), x satisfies $1.00 \leq x \leq 1.20$, desirably $1.00 \leq x \leq 1.05$, and more desirably is 1.00. y satisfies $0 \leq y \leq 1.20$, desirably $0 \leq y \leq 0.60$, and more desirably is 0. z satisfies $0 \leq z \leq 0.5$, desirably $0 \leq z \leq 0.10$, and more desirably is 0. δ satisfies $0 \leq \delta \leq 0.20$, desirably $0 \leq \delta \leq 0.05$, and more desirably is 0.

In the present embodiment, the spinel-type manganese-containing composite oxide having a specific composition may be used alone, or two or more kinds of spinel-type manganese-containing composite oxides having different compositions may be used in combination. When a non-aqueous electrolyte secondary battery using $LiMn_2O_4$ is repeatedly charged and discharged at a high temperature, the capacity deterioration thereof is particularly large. Therefore, in the present embodiment, it is advantageous that the spinel-type manganese-containing composite oxide be $LiMn_2O_4$ because the effect of suppressing capacity deterioration of the battery according to the present embodiment becomes more prominent. Further, the use of $LiMn_2O_4$ has an advantage that high thermal stability can be imparted to the non-aqueous electrolyte secondary battery using the positive electrode 50, and the cost can be reduced.

In the present embodiment, the spinel-type manganese-containing composite oxide may have a cracked portion. This cracking can typically occur due to press processing or the like when the positive electrode active material layer 54 is densified.

The average particle diameter (median diameter D50) of the positive electrode active material is not particularly limited, and is, for example, 0.05 μm or more and 25 μm or less, desirably 0.5 μm or more and 23 μm or less, and more desirably 3 μm or more and 22 μm or less. In the present description, unless otherwise specified, the average particle diameter (median size D50) is a particle diameter with a cumulative frequency from a small particle diameter side of 50% in volume percentage in a particle size distribution measured by a laser diffraction/scattering method.

In addition to the spinel-type manganese-containing composite oxide, the positive electrode active material layer 54 may include a positive electrode active material other than the spinel-type manganese-containing composite oxide as long as the effects of the present disclosure are not significantly impaired. The amount of the positive electrode active material is not particularly limited, and is desirably 70% by mass or more, more desirably 80% by mass or more, and even more desirably 85% by mass or more in the positive electrode active material layer 54 (that is, with respect to the total mass of the positive electrode active material layer 54).

In the present embodiment, the positive electrode active material layer 54 also includes orthophosphoric acid ($H_3PO_4$). Orthophosphoric acid is a component that contributes to the formation of a modified coating film, and the coating film includes a P component derived from orthophosphoric acid. The amount of orthophosphoric acid is 0.05% by mass or more and 1.0% by mass or less with respect to the positive electrode active material in order to adequately obtain the effect of improving the capacity deterioration resistance by the coating film. From the viewpoint of a higher capacity deterioration resistance improving effect, the amount of orthophosphoric acid with respect to the positive electrode active material is desirably 0.08% by mass or more, and more desirably 0.1% by mass or more. Meanwhile, the amount of orthophosphoric acid with respect to the positive electrode active material is desirably 0.5% by mass or less.

The positive electrode active material layer 54 may include components other than the positive electrode active material. Examples of such components include trilithium phosphate, conductive materials, binders, phosphonic acid, and the like.

Trilithium phosphate ($Li_3PO_4$) is also a component that contributes to the formation of a coating film on the surface of the positive electrode active material. When the positive electrode active material layer 54 includes trilithium phosphate, the coating film on the surface of the positive electrode active material formed by orthophosphoric acid can be further modified. As a result, it is possible to further enhance the capacity deterioration resistance when the lithium ion secondary battery 100 is repeatedly charged and discharged at a high temperature.

The particle diameter of trilithium phosphate is not particularly limited. The smaller the particle diameter of trilithium phosphate, the larger the specific surface area of trilithium phosphate and the consumption of trilithium phosphate for coating film formation is facilitated. That is, the smaller the particle diameter of the trilithium phosphate particles, the more advantageous this is for coating film formation. Therefore, the average particle diameter (median diameter D50) of trilithium phosphate is desirably 10 μm or less, more desirably 5 μm or less, and further desirably 3 μm or less. Meanwhile, the average particle diameter of trilithium phosphate may be 0.05 μm or more, and may be 0.1 μm or more.

The amount of trilithium phosphate in the positive electrode active material layer 54 is not particularly limited, and is, for example, 0.01% by mass or more and 10% by mass or less, and desirably 0.1% by mass or more and 5% by mass or less, even more desirably 0.2% by mass or more and 3% by mass or less, and further desirably 0.2% by mass or more and 1% by mass or less with respect to the positive electrode active material.

As the conductive material, for example, carbon black such as acetylene black (AB) or other carbon material (for example, graphite or the like) can be suitably used. The amount of the conductive material in the positive electrode active material layer 54 is not particularly limited, and is, for example, 0.1% by mass or more and 20% by mass or less, desirably 1% by mass or more and 15% by mass or less, and more desirably 2% by mass or more and 10% by mass or less.

As the binder, for example, polyvinylidene fluoride (PVdF) or the like can be used. The amount of the binder in the positive electrode active material layer 54 is not particularly limited, and is, for example, 0.5% by mass or more and 15% by mass or less, desirably 1% by mass or more and 10% by mass or less, and more desirably 1.5% by mass or more and 8% by mass or less.

Phosphonic acid is also a component that contributes to the formation of a coating film on the surface of the positive electrode active material. When the positive electrode active material layer 54 includes phosphonic acid, the coating film on the surface of the positive electrode active material formed by orthophosphoric acid can be further modified. As a result, the capacity deterioration resistance when the lithium ion secondary battery 100 is repeatedly charged and discharged can be further enhanced. The amount of phosphonic acid is not particularly limited, and is, for example, 0.05% by mass or more and 1.0% by mass or less.

The density of the positive electrode active material layer 54 is not particularly limited. The density of the positive electrode active material layer 54 may be 2.0 g/cm³ or more, and may be 2.3 g/cm³ or more. When the density of the positive electrode active material layer 54 is 2.6 g/cm$^3$ or more, many cracks are likely to occur in the lithium manganate particles due to the press treatment. For this reason, the capacity deterioration tends to be large. Therefore, the density of the positive electrode active material layer 54 is desirably 2.6 g/cm$^3$ or more because the effect of suppressing capacity deterioration by the coating film is particularly large. Meanwhile, the density of the positive electrode active material layer 54 may be 3.3 g/cm$^3$ or less, and may be 3.0 g/cm$^3$ or less. In the present description, the density of the positive electrode active material layer 54 refers to the apparent density of the positive electrode active material layer 54.

The thickness of the positive electrode active material layer 54 is not particularly limited, and is, for example, 10 μm or more and 300 μm or less, and desirably 20 μm or more and 200 μm or less.

As the negative electrode current collector 62 constituting the negative electrode sheet 60, a known negative electrode current collector used in a lithium ion secondary battery may be used, and an example thereof is a sheet or foil of a metal having good conductivity (for example, copper, nickel, titanium, stainless steel, and the like). Copper foil is desirable as the negative electrode current collector 62.

The dimensions of the negative electrode current collector 62 are not particularly limited and may be determined, as appropriate, according to the battery design. When a copper foil is used as the negative electrode current collector 62, the thickness thereof is not particularly limited, and is, for example, 5 μm or more and 35 μm or less, and desirably 7 μm or more and 20 μm or less.

The negative electrode active material layer 64 includes a negative electrode active material. In this embodiment, graphite is used as the negative electrode active material. The graphite may be natural graphite or artificial graphite, or may be amorphous carbon-coated graphite in which graphite is coated with an amorphous carbon material.

The average particle diameter (median diameter D50) of the negative electrode active material is not particularly limited, and is, for example, 0.1 μm or more and 50 μm or less, desirably 1 μm or more and 25 μm or less, and more desirably 5 μm or more and 20 μm or less.

In addition to graphite, the negative electrode active material layer 64 may include a positive electrode active material other than graphite as long as the effects of the present disclosure are not significantly impaired. The amount of the negative electrode active material in the negative electrode active material layer 64 is not particularly limited, and is desirably 90% by mass or more, and more desirably 95% by mass or more.

The negative electrode active material layer 64 may include components other than the negative electrode active material, such as a binder and a thickener.

As the binder, for example, styrene butadiene rubber (SBR) and modification products thereof, acrylonitrile butadiene rubber and modification products thereof, acrylic rubber and modification products thereof, fluororubber, and the like can be used. Among them, SBR is desirable. The amount of the binder in the negative electrode active material layer 64 is not particularly limited, and is desirably 0.1% by mass or more and 8% by mass or less, and more desirably 0.2% by mass or more and 3% by mass or less.

As the thickener, for example, a cellulose-based polymer such as carboxymethyl cellulose (CMC), methyl cellulose (MC), cellulose acetate phthalate (CAP), hydroxypropylmethyl cellulose (HPMC), and the like; polyvinyl alcohol (PVA) and the like can be used. Among them, CMC is desirable. The amount of the thickener in the negative electrode active material layer 64 is not particularly limited, and is desirably 0.3% by mass or more and 3% by mass or less, and more desirably 0.4% by mass or more and 2% by mass or less.

The thickness of the negative electrode active material layer 64 is not particularly limited, and is, for example, 10 μm or more and 300 μm or less, and desirably 20 μm or more and 200 μm or less.

Examples of the separator 70 include a porous sheet (film) made of a resin such as polyethylene (PE), polypropylene (PP), a polyester, cellulose, and a polyamide. The porous sheet may have a single-layer structure or a laminated structure of two or more layers (for example, a three-layer structure in which PP layers are laminated on both sides of a PE layer). A heat resistant layer (HRL) may be provided on the surface of the separator 70.

The thickness of the separator 70 is not particularly limited, and is, for example, 5 μm or more and 50 μm or less, desirably 10 μm or more and 30 μm or less.

The non-aqueous electrolytic solution 80 includes a fluorine-containing lithium salt. The non-aqueous electrolytic solution 80 typically includes a non-aqueous solvent and a fluorine-containing lithium salt as an electrolyte salt (in other words, a support salt). As the non-aqueous solvent, various organic solvents such as carbonates, ethers, esters, nitriles, sulfones, lactones, and the like used in the electrolytic solution of a general lithium ion secondary battery can be used without particular limitation. Among them, carbonates are desirable, and specific examples thereof include ethylene carbonate (EC), propylene carbonate (PC), diethyl carbonate (DEC), dimethyl carbonate (DMC), ethylmethyl carbonate (EMC), monofluoroethylene carbonate (MFEC), difluoroethylene carbonate (DFEC), monofluoromethyldifluoromethyl carbonate (F-DMC), trifluorodimethyl carbonate (TFDMC), and the like. As such a non-aqueous solvent, one kind may be used alone, or two or more kinds may be used in combination as appropriate.

Examples of the fluorine-containing lithium salt include $LiPF_6$, $LiBF_4$, lithium bis(fluorosulfonyl)imide (LiFSI), and the like. The fluorine-containing lithium salt is also a component that contributes to coating film formation, and the coating film includes an F component derived from the fluorine-containing lithium salt. As the fluorine-containing lithium salt, $LiPF_6$ is desirable because a sufficient amount of the F component can be easily supplied to the coating film. The concentration of the fluorine-containing lithium salt is not particularly limited, and is desirably 0.8 mol/L or more, and more desirably 1.0 mol/L or more because a sufficient amount of the F component can be easily supplied to the coating film. Meanwhile, from the viewpoint of suppressing an increase in battery resistance due to an increase in the viscosity of the non-aqueous electrolytic solution 80, the concentration of the fluorine-containing lithium salt is desirably 1.8 mol/L or less, and more desirably 1.5 mol/L or less.

In the related art, the decomposition of a non-aqueous electrolytic solution in the vicinity of a negative electrode is suppressed by using a titanium-containing lithium transition metal oxide having a spinel structure, which has low reactivity with the non-aqueous electrolytic solution, as the negative electrode active material. Meanwhile, in the present embodiment, graphite having a higher reactivity with the non-aqueous electrolytic solution than the titanium-containing lithium transition metal oxide having a spinel structure is used as the negative electrode active material. Therefore, in order to suppress the decomposition of the non-aqueous electrolytic solution in the vicinity of the negative electrode 60, the non-aqueous electrolytic solution 80 desirably includes an oxalate complex lithium salt. The oxalate complex lithium salt functions as a negative electrode coating film forming agent, and by forming a coating film derived from the oxalate complex lithium salt on the negative electrode 60, decomposition of the non-aqueous electrolyte solution in the vicinity of the negative electrode 60 can be suppressed and the capacity deterioration resistance of the lithium ion secondary battery 100 in repeated charging and discharging at a high temperature can be further improved.

As the oxalate complex lithium salt, a salt of a complex anion formed by a coordinate bond of at least one oxalate ion ($C_2O_4^{2-}$) with a central element (also referred to as a coordination atom) and a lithium ion can be used. Examples of the central element include metalloid elements such as boron (B) and phosphorus (P).

Specific examples of the oxalate complex lithium salt include a compound having a 4-coordinated structural moiety in which at least one oxalate ion ($C_2O_4^{2-}$) is coordinated with boron (B) as a central atom, for example, lithium bis(oxalato)borate ($Li[B(C_2O_4)_2]$; LiBOB) and lithium difluorooxalatoborate ($Li[BF_2(C_2O_4)]$; LiDFOB); a compound having a 6-coordinated structural moiety in which at least one oxalate ion ($C_2O_4^{2-}$) is coordinated with phosphorus (P) as a central atom, for example, lithium bis(oxalato)phosphate ($Li[P(C_2O_4)_3]$), lithium difluorobis(oxalato)phosphate ($Li[PF_2(C_2O_4)_2]$; LPFO), and the like. Among them, LiBOB is desirable because a highly durable coating film can be formed on the surface of the negative electrode active material and the resistance to capacity deterioration when the lithium ion secondary battery 100 is repeatedly charged and discharged at a high temperature can be remarkably improved.

The non-aqueous electrolytic solution 80 may include components other than the above-mentioned components, for example, various additives such as a gas generating agent such as biphenyl (BP), cyclohexylbenzene (CHB), and the like; a thickener; and the like, as long as the effects of the present disclosure are not significantly impaired.

By initially charging the lithium ion secondary battery 100 configured as described above to a voltage of 4.7 V or higher, a modified coating film can be formed on the surface of the positive electrode active material. As a result, it is possible to suppress capacity deterioration when the lithium ion secondary battery 100 is repeatedly charged and discharged at a high temperature (for example, about 60° C.).

Specifically, Mn is easily eluted from the spinel-type manganese-containing composite oxide, Li ions are easily deactivated by the eluted Mn, and capacity deterioration is likely to occur. Therefore, in the related art, there is a problem that the capacity of a lithium ion secondary battery using a spinel-type manganese-containing composite oxide as a positive electrode active material is significantly deteriorated in repeated charging and discharging at a high temperature.

By contrast, in the lithium ion secondary battery 100 according to the present embodiment, graphite is used as the negative electrode active material, and thereby the initial charging can be performed to a high voltage of 4.7 V or more. This voltage of 4.7 V or higher is usually a high voltage that causes deterioration of the positive electrode active material. However, in the present embodiment, the presence of orthophosphoric acid in the positive electrode active material layer 54 makes it possible to form a coating film layer enriched with phosphorus on the surface of the positive electrode active material and also to form thereon a coating film layer enriched with fluorine, while suppressing deterioration of the positive electrode active material. With the coating film having a multilayer structure of the coating film layer enriched with phosphorus and the coating film layer enriched with fluorine, it is possible to suppress the elution of Mn from the positive electrode active material and suppress the deactivation of Li ions by the eluted Mn. As a result, the capacity deterioration of the lithium ion secondary battery 100 in repeated charging and discharging at a high temperature can be suppressed.

Accordingly, from another point of view, a method for manufacturing a non-aqueous electrolyte secondary battery according to the present embodiment includes a step of preparing a non-aqueous electrolyte secondary battery having the above configuration (that is, the non-aqueous electrolyte secondary battery (1)) (hereinafter, also referred to as "step A") and a step of performing initial charging of the prepared non-aqueous electrolyte secondary battery to a voltage of 4.7 V or higher (hereinafter, also referred to as "step B"). Hereinafter, the manufacturing method will be described by taking as an example the case where the non-aqueous electrolyte secondary battery (1) is the above-mentioned lithium ion secondary battery 100.

First, step A will be described. The lithium ion secondary battery 100 can be produced and prepared according to a known method.

Specifically, for example, a positive electrode active material including a spinel-type manganese-containing composite oxide, orthophosphoric acid of 0.05% by mass or more and 1.0% by mass or less with respect to the positive electrode active material, an optional component of the positive electrode active material layer 54 (for example, trilithium phosphate, a binder, and the like), and a solvent (for example, N-methylpyrrolidone and the like) are mixed to prepare a paste for forming a positive electrode active material layer. The paste is applied onto the positive electrode current collector 52 and dried to form the positive electrode active material layer 54. If necessary, the positive electrode active material layer 54 is subjected to press treatment to obtain the positive electrode sheet 50.

Here, the particles of the spinel-type manganese-containing composite oxide may be cracked by the press treatment. The conditions for the press treatment are such that the density of the positive electrode active material layer 54 is to be desirably 2.0 g/cm$^3$ or more, more desirably 2.3 g/cm$^3$ or more, and further desirably 2.6 g/cm$^3$ or more. The density of the positive electrode active material layer 54 after the press treatment may be 3.3 g/cm$^3$ or less, or 3.0 g/cm$^3$ or less.

A paste for forming a negative electrode active material layer is prepared by mixing a negative electrode active material including graphite, an optional component of the negative electrode active material layer 64 (for example, a binder, a thickener, and the like) and a solvent (for example, water and the like). The paste is applied onto the negative electrode current collector 62 and dried to form the negative electrode active material layer 64. If necessary, the negative electrode active material layer 64 is subjected to press treatment to obtain the negative electrode sheet 60.

In the present description, the "paste" refers to a mixture in which a part or all of the solid content is dispersed in a solvent, and includes so-called "slurry", "ink", and the like.

The separator 70 is prepared, and the positive electrode sheet 50 and the negative electrode sheet 60 are overlapped with the separator 70 interposed therebetween to prepare the electrode body 20. The electrode body 20 is accommodated in the battery case 30 together with the non-aqueous electrolytic solution 80 and the battery case 30 is sealed. The lithium ion secondary battery 100 can thus be produced.

Specifically, for example, when the electrode body 20 is a wound electrode body as in the illustrated example, as shown in FIG. 2, a stacked body is produced by overlapping the positive electrode sheet 50 and the negative electrode sheet 60 together with the two separators 70, a wound body is produced by winding the stacked body in the longitudinal direction, and then the wound body is flattened by press treatment or the like to produce the electrode body 20. When the electrode body 20 is a stacked-type electrode body, a plurality of positive electrode sheets 50 and a plurality of negative electrode sheets 60 are alternately stacked while interposing the separator 70 therebetween, thereby producing the electrode body 20.

As the battery case 30, for example, a battery case including a case body having an opening and a lid for closing the opening is prepared. The lid is provided with an injection port (not shown) for injecting the non-aqueous electrolytic solution 80.

The positive electrode terminal 42 and the positive electrode current collector plate 42a, as well as the negative electrode terminal 44 and the negative electrode current collector plate 44a are attached to the lid of the battery case 30. The positive electrode current collector plate 42a and the negative electrode current collector plate 44a are welded respectively to the positive electrode active material layer non-formation portion 52a and the negative electrode active material layer non-formation portion 62a exposed at the ends of the electrode body 20. Then, the electrode body 20 is accommodated inside the battery case 30 through the opening of the main body of the battery case 30, and the main body of the battery case 30 and the lid are welded to each other.

Subsequently, the non-aqueous electrolytic solution 80 is injected from the injection port, and then the injection port is sealed. The lithium ion secondary battery 100 can thus be obtained.

Next, step B will be described. In step B, the lithium ion secondary battery 100 is initially charged to a voltage of 4.7 V or higher. The initial charging processing can be performed using a known charger or the like.

By initial charging to such a high voltage, a modified coating film can be formed on the surface of the positive electrode active material. The initial charging processing is desirably performed until the voltage reaches 4.8 V or higher because the effect of suppressing capacity deterioration is further increased.

As an example of the initial charging processing, first, charging is performed with a current value of, for example, 0.05C or more and 2C or less (desirably 0.05C or more and 1C or less) until a voltage reaches 4.7 V or more by constant-current charging. The upper limit of the voltage at the time of initial charging is not particularly limited. The upper limit is, for example, 5.1 V, desirably 5.0 V.

A coating film can be formed by charging until the voltage reaches 4.7 V or higher, but in order to increase the amount of the coating film, constant-voltage charging may be performed after the constant-current charging. The time for constant-voltage charging is not particularly limited, and is, for example, 1 hour or more and 10 hours or less, and desirably 3 hours or more and 7 hours or less.

By carrying out the above steps, the lithium ion secondary battery 100 in which a coating film is formed on the surface of the positive electrode active material can be obtained.

At least a part of the coating film on the surface of the positive electrode active material has a multi-layer structure including a lower layer enriched with phosphorus (P) and an upper layer enriched with fluorine (F). In the lower layer enriched with phosphorus, the ratio of the content (atomic %) of P element with respect to the total content (atomic %) of P element and F element determined by scanning transmission electron microscopy/energy dispersive X-ray analysis (STEM-EDX) can be 67% or more. Further, in the upper layer enriched with fluorine, the ratio of the content (atomic %) of F element to the total content (atomic %) of the P element and the F element determined by STEM-EDX can be 38% or more.

Therefore, from another point of view, the second embodiment of the non-aqueous electrolyte secondary battery disclosed herein (hereinafter, also referred to as "non-aqueous electrolyte secondary battery (2)") includes a positive electrode, a negative electrode, and a non-aqueous electrolyte solution. The positive electrode includes a positive electrode active material layer containing a positive electrode active material. The positive electrode active material includes a lithium composite oxide having a spinel-type crystal structure and including Mn. The negative electrode includes a negative electrode active material layer containing a negative electrode active material. The negative electrode active material is graphite. The non-aqueous electrolytic solution includes a fluorine-containing lithium salt. The positive electrode active material has a coating film on the surface thereof. At least a part of the coating film has a multi-layer structure including a first layer and a second layer located on the first layer. In the first layer, the ratio of the content (atomic %) of P element to the total content (atomic %) of P element and F element determined by STEM-EDX is 67% or more. In the second layer, the ratio of the content (atomic %) of the F element to the total content (atomic %) of P element and F element determined by STEM-EDX is 38% or more.

Taking the above-mentioned lithium ion secondary battery 100 as an example, in the non-aqueous electrolyte secondary battery (2), the coating film is formed on the surface of the positive electrode active material of the lithium ion secondary battery 100.

In the non-aqueous electrolyte secondary battery (2), the amount of orthophosphoric acid in the positive electrode active material layer 54 can be reduced to 0% by mass by forming the coating film. In the non-aqueous electrolyte secondary battery (2), orthophosphoric acid is no longer an essential component. Therefore, the amount of orthophosphoric acid with respect to the positive electrode active material in the positive electrode active material layer 54 may be 0% by mass or more and less than 1.0% by mass, and may be 0% by mass or more and less than 0.5% by mass.

In the first layer of the multi-layered coating, the ratio of the content (atomic %) of P element to the total content (atomic %) of P element and F element determined by STEM-EDX is 67% or more, desirably 70% or more, and more desirably 75% or more. Further, the ratio of the content (atomic %) of P element to the total content of P element and F element may be 90% or less, and may be 85% or less. Therefore, the ratio of the content of F element to the total content of P element and F element is 33% or less, desirably 30% or less, and more desirably 25% or less. Further, the ratio of the content of F element to the total content of P element and F element may be 10% or more, and may be 15% or more.

The content of F element contained in the first layer may be 0.5 atomic % or more, 1.0 atomic % or more, 1.5 atomic % or more, or 2.0 atomic % or more. Meanwhile, the content of F element contained in the first layer may be 5.0 atomic % or less, 4.0 atomic % or less, or 3.5 atomic % or less.

The content of P element contained in the first layer may be 7.0 atomic % or more, 8.0 atomic % or more, 9.0 atomic % or more, or 9.5 atomic % or more. Meanwhile, the content of P element contained in the first layer may be 14.0 atomic % or less, 12.0 atomic % or less, or 11.0 atomic % or less.

In the second layer of the multi-layered coating, the ratio of the content (atomic %) of F element to the total content (atomic %) of P element and F element determined by STEM-EDX is 38% or more, desirably 40% or more, more desirably 45% or more. Further, the ratio of the content (atomic %) of P element to the total content of P element and F element may be 62% or less, and may be 60% or less. Therefore, the ratio of the content of F element to the total content of P element and F element is 62% or less, desirably 60% or less, and more desirably 55% or less. Further, the ratio of the content of P element to total content of P element and F element may be 38% or more, and may be 40% or more.

The content of F element contained in the second layer may be 3.0 atomic % or more, 4.0 atomic % or more, 5.0 atomic % or more, or 6.0 atomic % or more. Meanwhile, the content of F element contained in the second layer may be 10.0 atomic % or less, 9.0 atomic % or less, or 8.0 atomic % or less.

The content of P element contained in the second layer may be 4.0 atomic % or more, 5.0 atomic % or more, 6.0 atomic % or more, or 6.5 atomic % or more. Meanwhile, the content of P element contained in the second layer may be 12.0 atomic % or less, 10.0 atomic % or less, or 9.0 atomic % or less.

The content (atomic %) of P element and F element in the first layer and the second layer can be determined by acquiring a high-angle annular dark-field image (STEM-HAADF image) of the coating film with a scanning transmission electron microscope (STEM) equipped with an energy dispersive X-ray spectroscopic analyzer, and performing EDX analysis on this STEM-HAADF image. The EDX analysis is performed, for example, by analyzing a distance of at least 20 nm by dividing the area in the direction perpendicular to the thickness direction of the coating film. Therefore, the first layer and the second layer may have dimensions of 20 nm or more in the direction perpendicular to the thickness direction.

When the positive electrode active material has a cracked portion, in the non-aqueous electrolyte secondary battery (2), the coating film is formed on the surface including the surface of the cracked portion of the positive electrode active material. In other words, the positive electrode active material has a coating film on the outer surface (or outer peripheral surface) and the surface of the cracked portion.

A part of the coating film formed on the surface of the positive electrode active material may have a multi-layer structure including the first layer having a high phosphorus content ratio and the second layer having a high F content ratio. It is desirable that 25% or more (in particular, 50% or more, even 75% or more) of the area of the coating film in the direction along the surface of the positive electrode active material (that is, in the circumferential direction) has the multi-layer structure in a part thereof in the thickness direction. The coating film may be scattered on the surface of the positive electrode active material layer or may cover the entire surface of the positive electrode active material layer.

The thickness of the coating film formed on the surface of the positive electrode active material is, for example, 20 nm or less (in particular, 1 nm or more and 20 nm or less) but is not limited thereto.

It should be noted that as an example, an angular lithium ion secondary battery 100 provided with a flat-shaped wound electrode body 20 has been described. However, the non-aqueous electrolyte secondary battery (1) and the non-aqueous electrolyte secondary battery (2) disclosed herein can be also configured as a lithium ion secondary battery provided with a stacked-type electrode body (that is, an electrode body in which a plurality of positive electrodes and a plurality of negative electrodes are alternately stacked). Further, the non-aqueous electrolyte secondary battery (1) and the non-aqueous electrolyte secondary battery (2) disclosed herein can be also configured as a cylindrical lithium ion secondary battery, a laminate-cased lithium ion secondary battery, a coin type lithium ion secondary battery, or the like. Further, the non-aqueous electrolyte secondary battery (1) and the non-aqueous electrolyte secondary battery (2) disclosed herein can be also configured as a non-aqueous electrolyte secondary battery other than the lithium ion secondary battery according to a known method.

The non-aqueous electrolyte secondary battery (1) and the non-aqueous electrolyte secondary battery (2) can be used for various purposes. Suitable applications include drive power supplies mounted on vehicles such as battery electric vehicles (BEVs), hybrid electric vehicles (HEVs), and plug-in hybrid electric vehicles (PHEVs). Further, the non-aqueous electrolyte secondary battery (1) and the non-aqueous electrolyte secondary battery (2) can be used as a storage battery for a small power storage device or the like. The non-aqueous electrolyte secondary battery (1) and the non-aqueous electrolyte secondary battery (2) may also be used in the form of battery pack, which is typically composed of a plurality of batteries connected in series and/or in parallel.

Hereinafter, examples relating to the present disclosure will be described, but the present disclosure is not intended to be limited to such examples.

Production of Lithium Ion Secondary Battery for Evaluation of Each Example $LiMn_2O_4$ as a positive electrode active material and orthophosphoric acid in the amount shown in Table 1 with respect to the positive electrode active material were mixed in N-methyl-2-pyrrolidone (NMP), and $LiMn_2O_4$ and orthophosphoric acid were brought into contact with each other for surface treatment. Carbon black (CB) as a conductive material and polyvinylidene fluoride (PVDF) as a binder were added to this mixture so as to obtain mass ratios of $LiMn_2O_4$:CB:PVDF=90:8:2, and solid components were dispersed to prepare a slurry for forming a positive electrode active material layer. However, in Examples 4 to 8, trilithium phosphate (LPO) was further added to the positive electrode active material in the amount shown in Table 1 to prepare a slurry for forming the positive electrode active material layer. A reagent manufactured by Merck Group was used for orthophosphoric acid.

This slurry for forming a positive electrode active material layer was applied onto an aluminum foil, dried, and then subjected to a densification treatment with a roll press to prepare a positive electrode sheet. This positive electrode sheet was cut to dimensions of 120 mm×100 mm.

Further, spheroidized graphite (C) as a negative electrode active material, styrene butadiene rubber (SBR) as a binder, and carboxymethyl cellulose (CMC) as a thickener were mixed in water at mass ratios of C:SBR:CMC=98:1:1 to prepare a paste for forming a negative electrode active material layer. This paste for forming a negative electrode active material layer was applied onto a copper foil, dried, and then subjected to a densification treatment with a roll press to prepare a negative electrode sheet. This negative electrode sheet was cut to dimensions of 122 mm×102 mm.

A porous polyolefin sheet was prepared as a separator sheet. An electrode body was prepared using the positive electrode sheet, negative electrode sheet, and separator, and after the electrode terminals were attached to the electrode body, the electrode body was accommodated in a battery case together with a non-aqueous electrolytic solution. The non-aqueous electrolytic solution was prepared by dissolving $LiPF_6$ at a concentration of 1.1 mol/L and also dissolving lithium bisoxalatoborate (LiBOB) at a concentration of 0.5% by mass in a mixed solvent including ethylene carbonate (EC), dimethyl carbonate (DMC), and ethyl methyl carbonate (EMC) at a volume ratios of 3:4:3. However, in Example 9, LiBOB was not added. In this way, a lithium ion secondary battery for evaluation of each example was produced.

Each of the obtained lithium-ion secondary batteries for evaluation was constant-current charged with a current value of 0.1C as initial charging processing under a temperature environment of 25° C. to the voltage shown in Table 1, and then constant-voltage charging was performed until the current reached 1/50C. As a result, a coating film was formed on the positive electrode. Then, constant-current discharging to 3.0 V was performed at a current value of 0.1C.

Production of Lithium Ion Secondary Batteries for Evaluation of Comparative Examples 1 and 2

$LiMn_2O_4$ as a positive electrode active material, CB, and PVDF were mixed in NMP so as to obtain mass ratios of $LiMn_2O_4$:CB:PVDF=90:8:2, and solid components were dispersed to prepare a slurry for forming a positive electrode active material layer. A lithium ion secondary battery for evaluation was produced by the same method as in Example 1 except that the prepared slurry for forming the positive electrode active material layer was used. An initial charging treatment was performed by the same method as in Example 1 to produce a coating film on the positive electrode.

Production of Lithium Ion Secondary Battery for Evaluation of Comparative Example 3

The above $LiMn_2O_4$ to which orthophosphoric acid was attached as a positive electrode active material, CB, and PVDF were mixed in NMP so as to obtain mass ratios of $LiMn_2O_4$:CB:PVDF=90:8:2, and solid components were dispersed to prepare a slurry for forming a positive electrode active material layer. A lithium ion secondary battery for evaluation was produced by the same method as in Example 1 except that the prepared slurry for forming a positive electrode active material layer was used. An initial charging treatment was performed by the same method as in Example 1 to produce a coating film on the positive electrode.

Production of Lithium Ion Secondary Battery for Evaluation of Comparative Example 4

A slurry for forming a positive electrode active material layer was prepared in the same manner as in Comparative Example 1. Using this slurry for forming a positive electrode active material layer, a lithium ion secondary battery for evaluation was prepared by the same method as in Example 1 except that LiBOB was not added to the non-aqueous electrolyte solution. An initial charge treatment was performed by the same method as in Example 1 to produce a coating film on the positive electrode.

Evaluation of Cycle Characteristic

The capacity at the time of discharge after the initial charging was measured, and the result was taken as the initial capacity. Each lithium ion secondary battery for evaluation that was initially charged was placed in an environment of 60° C., and 50 cycles of charging and discharging were preformed, one cycle of which included constant-current charging up to 4.2 V at 0.5C and constant-current discharging to 3.0 V at 0.5C. The discharge capacity after 50 cycles was determined by the same method as the initial capacity. A capacity retention rate (%) was obtained from [(discharge capacity after 50 cycles)/(initial capacity)]×100 as an index of cycle characteristic (capacity deterioration resistance). The results are shown in Table 1.

TABLE 1

| | Amount of orthophosphoric acid added (% by mass) | Amount of LPO added (% by mass) | Addition of LiBOB | Initial charging voltage (V) | Capacity retention ratio (%) |
|---|---|---|---|---|---|
| Example 1 | 0.1 | — | Yes | 4.95 | 93.0 |
| Example 2 | 0.5 | — | Yes | 4.95 | 92.3 |
| Example 3 | 1.0 | — | Yes | 4.95 | 91.0 |
| Example 4 | 0.1 | 0.5 | Yes | 4.95 | 96.5 |
| Example 5 | 0.5 | 0.5 | Yes | 4.95 | 95.9 |
| Example 6 | 1.0 | 0.5 | Yes | 4.95 | 94.1 |
| Example 7 | 0.1 | 0.2 | Yes | 4.95 | 95.2 |
| Example 8 | 0.1 | 0.8 | Yes | 4.95 | 96.7 |
| Example 9 | 0.1 | — | No | 4.95 | 89.0 |
| Example 10 | 0.1 | — | Yes | 4.7 | 88.8 |
| Comparative Example 1 | — | — | Yes | 4.2 | 86.0 |
| Comparative Example 2 | — | — | Yes | 4.95 | 79.8 |
| Comparative Example 3 | 0.1 | — | Yes | 4.2 | 87.2 |
| Comparative Example 4 | — | — | No | 4.95 | 76.2 |

As the results in Table 1 show, it is understood when the positive electrode active material layer of a lithium ion secondary battery includes a spinel-type manganese-containing composite oxide as the positive electrode active material and also includes orthophosphoric acid at 0.05% by mass or more and 1.0% by mass or less with respect to the positive electrode active material and when the lithium ion secondary battery is initially charged to a voltage of 4.7 V or more, the capacity retention rate is remarkably increased. Therefore, it is understood that by performing an appropriate initial charging treatment to the non-aqueous electrolyte secondary battery (1) described above, it is possible to suppress capacity deterioration in repeated charging and discharging at a high temperature. Further, it is understood that when the positive electrode active material layer further includes trilithium phosphate, capacity deterioration can be further suppressed. In addition, it is understood that when the non-aqueous electrolytic solution further includes LiBOB, capacity deterioration can be further suppressed.

Analysis of Coating Film by STEM-EDX

Figure 3:
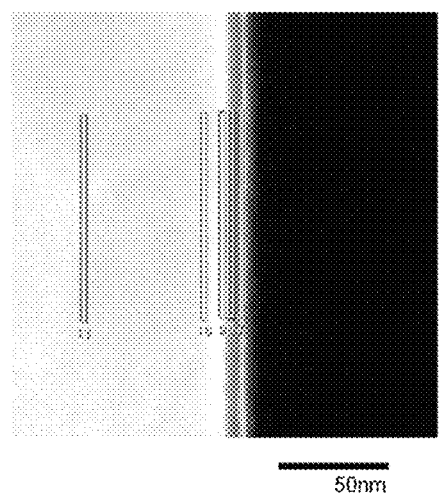
FIG. 3 is a STEM-HAADF image of the lithium ion secondary battery produced in Example 5.

The lithium ion secondary battery for evaluation of Example 5 that had been evaluated above was disassembled under an argon atmosphere, and the positive electrode was taken out. The positive electrode was washed with ethyl methyl carbonate to remove the electrolytic solution, and dried. The positive electrode was embedded in a resin and cut with a focused ion beam (FIB) to prepare a measurement material. This was observed using a scanning transmission electron microscope (Cs-STEM) with a spherical aberration correction function, and a STEM-HAADF image was obtained. This STEM-HAADF image is shown in FIG. 3. Analysis regions 7 to 11 were set as shown in FIG. 3, and the constituent elements and amounts thereof (atomic %) in these regions were determined by energy dispersive X-ray analysis (EDX). Table 2 shows the measurement results of the analysis regions 7 to 10.

TABLE 2

| Analysis region | B | C | O | F | Al | P | S | Mn |
|---|---|---|---|---|---|---|---|---|
| 7 | 0.0 | 27.4 | 46.1 | 6.7 | 2.6 | 7.0 | 0.7 | 9.5 |
| 8 | 0.4 | 13.2 | 59.1 | 2.8 | 0.4 | 9.9 | 0.0 | 14.2 |
| 9 | 0.0 | 7.9 | 57.3 | 0.9 | 0.6 | 2.2 | 0.0 | 31.0 |
| 10 | 0.0 | 5.5 | 64.6 | 0.0 | 0.6 | 0.1 | 0.0 | 29.1 |

Units of numerical values for the constituent elements in the table are atomic %.

From the results shown in FIG. 3 and Table 2, it is understood that a layer enriched with P element is formed in the analysis region 8, and a layer enriched with F element is formed in the analysis region 7. Therefore, it can be said that the capacity deterioration resistance of the lithium ion secondary battery in repeated charging and discharging is increased by a special coating film in which the layer enriched with F element is formed on the layer enriched with P element. In the analysis region 8, the ratio of the content (atomic %) of P element to the total content (atomic %) of P element and F element was 78%. Further, in the analysis region 7, the ratio of the content (atomic %) of F element to the total content (atomic %) of P element and F element was 48.9%.

Therefore, it is understood that with the non-aqueous electrolyte secondary battery (2) disclosed herein, the capacity deterioration in repeated charging and discharging at a high temperature can be suppressed.

Although specific examples of the present disclosure have been described in detail above, these are merely examples and do not limit the scope of claims. The techniques described in the claims include various changes and modifications of the specific examples presented above.

What is claimed is:

1. A non-aqueous electrolyte secondary battery including a positive electrode, a negative electrode, and a non-aqueous electrolytic solution, wherein
   the positive electrode includes a positive electrode active material layer containing a positive electrode active material;
   the positive electrode active material includes a lithium composite oxide having a spinel-type crystal structure and including Mn;
   the negative electrode includes a negative electrode active material layer containing a negative electrode active material;
   the negative electrode active material is graphite;
   the non-aqueous electrolytic solution includes a fluorine-containing lithium salt;
   the positive electrode active material has a coating film on the surface thereof;
   at least a part of the coating film has a multi-layer structure including a first layer and a second layer located on the first layer;
   in the first layer, the ratio of the content (atomic %) of P element to the total content (atomic %) of P element and F element determined by scanning transmission electron microscopy/energy dispersive X-ray analysis is 67% or more; and
   in the second layer, the ratio of the content (atomic %) of F element to the total content (atomic %) of P element and F element determined by scanning transmission electron microscopy/energy dispersive X-ray analysis is 38% or more.

2. The non-aqueous electrolyte secondary battery according to claim 1, wherein the lithium composite oxide is $LiMn_2O_4$.

3. The non-aqueous electrolyte secondary battery according to claim 1, wherein a thickness of the coating film on the surface of the positive electrode active material is 1 nm or more and 20 nm or less.

* * * * *